US012709576B2

(12) United States Patent
Shamshafshejani et al.

(10) Patent No.: US 12,709,576 B2
(45) Date of Patent: Aug. 18, 2026

(54) PROCESS FOR PRODUCING AUTOCLAVED AERATED CONCRETE USING SILICA RAW MATERIALS HAVING HIGHER SOLUBILITY THAN QUARTZ

(71) Applicant: Fraunhofer-Gesellschaft zur Förderung der angewandten Forschung e.V., Munich (DE)

(72) Inventors: Taban Shamshafshejani, Valley (DE); Georg Schober, Landau an der Isar (DE); Severin Seifert, Valley (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 774 days.

(21) Appl. No.: 17/920,547

(22) PCT Filed: Apr. 19, 2021

(86) PCT No.: PCT/EP2021/060093

§ 371 (c)(1),
(2) Date: Oct. 21, 2022

(87) PCT Pub. No.: WO2021/219421

PCT Pub. Date: Nov. 4, 2021

(65) Prior Publication Data

US 2023/0146063 A1 May 11, 2023

(30) Foreign Application Priority Data

Apr. 28, 2020 (EP) .................................... 20171792

(51) Int. Cl.

| | |
|---|---|
| ***C04B 28/18*** | (2006.01) |
| ***C04B 38/02*** | (2006.01) |
| ***C04B 40/02*** | (2006.01) |
| ***C04B 111/00*** | (2006.01) |

(52) U.S. Cl.

CPC .............. *C04B 28/18* (2013.01); *C04B 38/02* (2013.01); *C04B 40/024* (2013.01); *C04B 2111/00224* (2013.01); *C04B 2111/0025* (2013.01); *C04B 2201/20* (2013.01); *C04B 2235/3454* (2013.01)

(58) Field of Classification Search

CPC ... C04B 2111/00224; C04B 2111/0025; C04B 2201/20; C04B 2235/3454; C04B 28/18; C04B 38/02; C04B 38/10; C04B 40/024; Y02W 30/91

See application file for complete search history.

(56) References Cited

U.S. PATENT DOCUMENTS

| | | | |
|---|---|---|---|
| 4,193,958 | A | 3/1980 | Kawahara et al. |
| 4,298,561 | A | 11/1981 | Uchida et al. |

FOREIGN PATENT DOCUMENTS

| | | | | |
|---|---|---|---|---|
| CN | 106747580 | A | 5/2017 | |
| CN | 109761634 | A | 5/2019 | |
| DE | 10200416 | C1 | 8/2003 | |
| DE | 10066270 | B4 | 5/2007 | |
| EP | 2163534 | A1 * | 3/2010 | ............ C04B 28/18 |
| EP | 2371783 | A1 | 10/2011 | |
| EP | 2727462 | A1 | 5/2014 | |
| GB | 2106087 | A | 4/1983 | |
| JP | 2005179148 | A | 7/2005 | |
| JP | 2005-330150 | A1 | 12/2005 | |
| JP | 2006026616 | A | 2/2006 | |
| JP | 2011025646 | A | 2/2011 | |
| JP | 2012091945 | A | 5/2012 | |
| WO | 1999/042418 | A1 | 8/1999 | |
| WO | 200211960 | A1 | 2/2002 | |
| WO | 2018154013 | A1 | 8/2018 | |

OTHER PUBLICATIONS

Siacuiunas et al. "Formation of gyrolite during hydrothermal synthesis in the mixtures of CaO and amorphous SiO2 or quartz" Cement and Concrete Research 2004, 34, 2029-2036 (Year: 2004).*

Buachy et al. "Is Cement a Glassy Material?" Proceedings of Euro-C 2014, St. Anton am Arlberg, Austria, CRC Press, 2014 (Year: 2014).*

Geology Outreach, "Pumice" 2015, Learning Geology, Blogspot (https://geologylearn.blogspot.com/2015/03/pumice.html) (Year: 2015).*

Hedenquist et al. "Epithermal ore deposits: first-order features relevant to exploration and assessment" 14th SGA Biennial Meeting 2017, vol. 1 (Year: 2017).*

Albayrak et al. "Influence of zeolite additive on properties of autoclaved aerated concrete" Building and Environment 2007, 42, 3161-3165 (Year: 2007).*

Machine translation of EP2163534A1 (Year: 2010).*

Bauchy et al. "Is Cement a Glassy Material?" Proceedings of Euro-C 2014, St. Anton am Arlberg, Austria, CRC Press, 2014 (Year: 2014).*

Applicant: Fraunhofer-Gesellschaft zur Forderung der angewandten Forschung e.V; "Process for Producing Autoclaved Aerated Concrete Using Silica Raw Materials having Higher Solubility than Quartz"; Chinese Application No. 202180030250.8; First Chinese Office Action; dated Mar. 25, 2023; 18 pgs.

Jian Tian, et al.; "Study on Application of Silica Mud to Autoclaved Aerated Concrete"; School of Materials Science and Engineering, Hubei University; 5 pgs.

(Continued)

*Primary Examiner* — Amber R Orlando
*Assistant Examiner* — Ryan Patrick Loughran
(74) *Attorney, Agent, or Firm* — Tarolli, Sundheim, Covell & Tummino LLP

(57) ABSTRACT

The present invention relates to an autoclaved aerated concrete having a content of tobermorite of at least 12.5 wt % and a content of amorphous CSH phases of at least 30 wt %, based on the total weight amount of autoclaved aerated concrete, the process for producing said autoclaved aerated concrete using a silica source, which comprises a soluble silica species and a low curing temperature and the use of a silica source, which comprises a soluble silica species for the production of an autoclaved aerated concrete.

12 Claims, No Drawings

(56) References Cited

OTHER PUBLICATIONS

Liu Zongqi, et al.; "Effect of Hydrated Calcium Silicate Composition on the Mechanical Properties of Autoclaved Silicate Materials"; College of Mechanics and Materials, Hohai University; 5 pgs.
He, et al.; "Application status and development trend of waste aerated concrete"; China Building Materials Technology 27(5) 45-47; 3 pgs.
Tao and Wang; "Production of Autoclaved Aerated Concrete Blocks"; China Building Materials Industry Press; pp. 423-424.
Australian Application No. 2021265040, Examination Report dated Dec. 9, 2023.
Kurama, H., et al., Properties of the Autoclaved Aerated Concrete Produced From Coal Bottom Ash, Journal of Materials Processing Technology 209 (2009) 767-773.
Japanese Application No. 2022-564187, Office Action dated Nov. 8, 2023.
Karakurt, et al., Cement & Concrete Composites, Oct. 13, 2009, vol. 32, pp. 1-8.
Karakurt, C., Kurama, H., & Topçu, I. B. (2010). Utilization of natural zeolite in aerated concrete production. Cement and Concrete Composites, 32(1), 1-8. https://doi.org/10.1016/j.cemconcomp.2009.10.002.
Applicant: Fraunhofer-Gesellschaft zur Forderung der angewandten Forschung e.V; European Application No. EP20171792; Extended European Search Report; dated Oct. 13, 2020; 11 pgs.
Straube, B.; Walther, H.; "ACC with low thermal conductivity", 5th International Conference on Autoclaved Aerated Concrete, Sep. 17, 2011, pp. 371-374, XP002800667, Bydgoszcz Retrieved from the Internet: URL:https://www.xella.com/de/docs/SKMBT_C253_12091713140_pdf.
J. Alexanderson; "Relations between structure and mechanical properties of autoclaved aerated concrete"; Cement and Concrete Research, V. 25, No. 2, pp. 243-248, 1995; Cement and Concrete Research, V. 9, No. 4, pp. 507-514, 1979).
Isu, N., Ishida, H., & Mitsuda, T. (1995). Influence of quartz particle size on the chemical and mechanical properties of autoclaved aerated concrete (I) tobermorite formation. Cement and Concrete Research, 25(2), 243-248. doi:10.1016/0008-8846(95)00003-8.

* cited by examiner

PROCESS FOR PRODUCING AUTOCLAVED AERATED CONCRETE USING SILICA RAW MATERIALS HAVING HIGHER SOLUBILITY THAN QUARTZ

The present invention relates to an autoclaved aerated concrete having a high compressive strength, the process for producing said autoclaved aerated concrete using a silica source, which comprises a soluble silica species and a reduced steam curing temperature and the use of a silica source, which comprises a soluble silica species for the production of an autoclaved aerated concrete.

TECHNICAL BACKGROUND

Climate changing and global warming cause topics such as "ecology movement" or "Green movement" to have the highest priority in recent years. The building materials area is also strongly affected due to its huge extent and its great demand for energy and raw materials.

Compared with normal concrete and bricks, autoclaved aerated concrete (AAC) has a low consumption of energy and raw material. Because of this and its excellent thermal insulation, AAC has a high potential to be used as a key element for buildings in the future.

Currently, a major issue in developing AAC production is the energy consumption with its related carbon dioxide emission.

The steam curing process and the embodied energy of raw materials i.e. lime and cement require most of the primary energy in the procedure of producing AAC. The autoclaving process includes hydrothermal treatment of a mixture at elevated temperature, typically around 180-200° C. and pressure of 12-13 bar, under saturated steam condition. The autoclaving process affects the mechanical properties of AAC significantly and is an essential step for producing AAC (Isu N, Ishida H, Mitsuda L "Influence of quartz particle size on the chemical and mechanical properties of autoclaved aerated concrete (I) tobermorite formation," Cement and Concrete Research, V. 25, No. 2, pp. 243-248, 1995; Alexanderson J, "Relations between structure and mechanical properties of autoclaved aerated concrete," Cement and Concrete Research, V. 9, No. 4, pp. 507-514, 1979).

The main components to produce AAC are silica sand as $SiO_2$ source, lime, and cement as a CaO source. For the manufacturing of AAC as a building material, it is well established to use quartz as a silica source in the raw materials mixture. Quartz provides the main part of silica for the chemical reactions during steam curing.

The main feature of AAC is that it has a high strength although the density of the material is rather low (high porosity). The cause for the comparative high strength is the high amount of calcium silicate hydrate (CSH) phases of tobermorite type in the product, these CSH phases are the binding components in the microstructure of AAC. The steam curing process is necessary first to dissolve the silica raw material and second to establish the conditions for CSH formation. A reduction in steam curing time and temperature would provide a relevant economic advantage.

The dissolution behavior of different silica raw materials can be very different. Quartz has a relatively low solubility in water and the rate of dissolution is also relatively slow. Therefore, in the case of using quartz as a silica source in AAC, steam curing with a quite high temperature i.e. more than T>180° C. is required. However, with silica sources which have a higher solubility in water compared to quartz, there is a possibility to achieve lower steam curing temperatures. This would provide advantages in energy consumption i.e. lower curing temperature, shorter curing times, less binder (cement and lime) usage and also use of a wider range of raw materials.

However, with these other types of silica materials such as amorphous ones (siliceous earth, alkali-silica glass, water glass) or cristobalite which are known to have a higher solubility in water the expected advantages for AAC making such as shorter curing times or higher strength values or lower binder content in recipes could not be achieved to a sufficient extent until today.

Thus, there is a need in the art for AAC with a high mechanical strength, which can be produced in processes with low energy consumption.

It has surprisingly been found that when using a silica source, which comprises a soluble silica species for the production of an autoclaved aerated concrete and reducing the steam curing temperature and also setting the calcium/silicon molar ratio to low values an autoclaved aerated concrete is obtained which shows a high compressive strength.

SUMMARY OF THE INVENTION

The present invention relates to autoclaved aerated concrete having a content of tobermorite of at least 12.5 wt % and a content of amorphous CSH phases of at least 30 wt %, based on the total weight amount of autoclaved aerated concrete.

Further, the present invention relates to a process for producing the autoclaved aerated concrete as described above or below comprising the steps of:

a) Preparing a suspension comprising a silica source and a calcium oxide source in water, wherein the silica source comprises at least 50 wt % of soluble silica species;
b) Preparing a green highly porous solid from the suspension of step a);
c) Steam curing the green highly porous solid from step b) at a temperature of from 100° C. to 170° C. in the presence of saturated water steam; and
d) Recovering the autoclaved aerated concrete.

A soluble silica species according to the present invention is a silica species, which has a higher solubility in water at 25° C. and pH 8.5 than quartz (ppm).

It is preferred that the soluble silica species has a solubility in water at 25° C. and pH 8.5 of at least 4.0 ppm, more preferably of at least 5.0 ppm and most preferably at least 20 ppm.

The upper limit of the solubility in water at 25° C. and pH 8.5 can be 1000 ppm, such as 500 ppm.

Quartz has a solubility in water at 25° C. and pH 8.5 of 2.8 ppm.

Cristobalite has a solubility in water at 25° C. and pH 8.5 of 6 ppm.

Tridymite has a solubility in water at 25° C. and pH 8.5 of 4.5 ppm.

Stishovite has a solubility in water at 25° C. and pH 8.5 of 11 ppm.

extremely small particles of amorphous silica or porous aggregates have a solubility in water at 25° C. of 100-130 ppm.

Silica glass has a solubility in water at 25° C. of 39 ppm.

Water glass has a solubility in water at 25° C. of 60-90 ppm.

Still further, the present invention relates to the use of a silica source comprising at least 50 wt % of soluble silica species for the production of an autoclaved aerated concrete.

DETAILED DESCRIPTION

The autoclaved aerated concrete has a content of tobermorite of at least 12.5 wt %, more preferably of at least 13.0 wt %, still more preferably of at least 13.5 wt % and most preferably of at least 14.0 wt %, based on the total weight amount of autoclaved aerated concrete.

The upper limit of the content of tobermorite usually does not exceed 70.0 wt %, preferably 50.0 wt %.

To determine tobermorite content, XRD quantitative analysis was carried out using the Rietveld method and 10% of ZnO as the internal standard.

The autoclaved aerated concrete has a content of amorphous CSH phases of at least 30 wt %, preferably of at least 35 wt %, more preferably of at least 40 wt %, most preferably of at least 50 wt %, based on the total weight amount of autoclaved aerated concrete.

The upper limit of the content of amorphous CSH phases preferably does not exceed 70 wt %, more preferably 65 wt %, still more preferably 60 wt % and most preferably 58 wt %.

The content of amorphous CSH phases is determined by XRD quantitative analysis using the Rietveld method.

The autoclaved aerated concrete preferably has a content of residual quartz of not more than 20 wt %, more preferably not more than 17 wt %, still more preferably not more than 14 wt % and most preferably not more than 12 wt %, based on the total weight amount of autoclaved aerated concrete.

The lower limit of the content of residual quartz structures is usually at least 5 wt %, preferably at least 8 wt %.

The content of residual quartz is determined by XRD quantitative analysis and was carried out using the Rietveld method.

The autoclaved aerated concrete preferably has a content of phases of residual soluble silica species of not more than 5.0 wt %, preferably not more than 4.0 wt %, based on the total weight amount of autoclaved aerated concrete.

The autoclaved aerated concrete preferably does not contain any residual soluble silica species. The lower limit of the content of residual soluble silica species in certain embodiments can be 0.1 wt %, such as 0.2 wt %.

The content of residual soluble silica species is determined by XRD quantitative analysis was carried out using the Rietveld method.

The autoclaved aerated concrete preferably shows a peak of wollastonite ($CaSiO_3$) formation at a temperature of 835-843° C. in differential thermal analysis (DTA) in accordance with DIN 51004.

The autoclaved aerated concrete according to the present invention can be produced in all densities from 200 kg/$m^3$ to 800 kg/$m^3$.

It has been found that for a given density the autoclaved aerated concrete according to the present invention shows an exceptionally high compressive strength.

The density is measured in dry condition in accordance with DIN EN 772-13. The compressive strength is measured in accordance with DIN EN 772-1.

For a density of from 205 kg/$m^3$ to 250 kg/$m^3$ the autoclaved aerated concrete preferably has a compressive strength of at least 1.5 MPa, preferably at least 1.7 MPa, more preferably at least 1.9 MPa and most preferably at least 2.0 MPa.

The upper limit of the compressive strength for a density of from 200 kg/$m^3$ to 250 kg/$m^3$ can be up to 5.0 MPa, preferably up to 4.5 MPa.

For a density of from 255 kg/$m^3$ to 300 kg/$m^3$ the autoclaved aerated concrete preferably has a compressive strength of at least 2.0 MPa, preferably at least 2.2 MPa, more preferably at least 2.4 MPa and most preferably at least 2.6 MPa.

The upper limit of the compressive strength for a density of from 250 kg/$m^3$ to 300 kg/$m^3$ can be up to 5.5 MPa, preferably up to 5.0 MPa.

For a density of from 305 kg/$m^3$ to 350 kg/$m^3$ the autoclaved aerated concrete preferably has a compressive strength of at least 2.5 MPa, preferably at least 2.7 MPa, more preferably at least 3.0 MPa and most preferably at least 3.3 MPa.

The upper limit of the compressive strength for a density of from 300 kg/$m^3$ to 350 kg/$m^3$ can be up to 6.0 MPa, preferably up to 6.5 MPa.

For a density of from 355 kg/$m^3$ to 400 kg/$m^3$ the autoclaved aerated concrete preferably has a compressive strength of at least 3.0 MPa, preferably at least 3.4 MPa, more preferably at least 3.7 MPa and most preferably at least 4.1 MPa.

The upper limit of the compressive strength for a density of from 350 kg/$m^3$ to 400 kg/$m^3$ can be up to 6.5 MPa, preferably up to 6.0 MPa.

For a density of from 405 kg/$m^3$ to 450 kg/$m^3$ the autoclaved aerated concrete preferably has a compressive strength of at least 3.7 MPa, preferably at least 4.1 MPa, more preferably at least 4.5 MPa and most preferably at least 4.9 MPa.

The upper limit of the compressive strength for a density of from 400 kg/$m^3$ to 450 kg/$m^3$ can be up to 7.0 MPa, preferably up to 6.5 MPa.

For a density of from 455 kg/$m^3$ to 500 kg/$m^3$ the autoclaved aerated concrete preferably has a compressive strength of at least 4.5 MPa, preferably at least 5.0 MPa, more preferably at least 5.5 MPa and most preferably at least 5.9 MPa.

The upper limit of the compressive strength for a density of from 450 kg/$m^3$ to 500 kg/$m^3$ can be up to 8.0 MPa, preferably up to 7.5 MPa.

For a density of from 505 kg/$m^3$ to 550 kg/$m^3$ the autoclaved aerated concrete preferably has a compressive strength of at least 5.3 MPa, preferably at least 5.9 MPa, more preferably at least 6.5 MPa and most preferably at least 7.1 MPa.

The upper limit of the compressive strength for a density of from 500 kg/$m^3$ to 550 kg/$m^3$ can be up to 9.0 MPa, preferably up to 8.5 MPa.

For a density of from 555 kg/$m^3$ to 600 kg/$m^3$ the autoclaved aerated concrete preferably has a compressive strength of at least 6.3 MPa, preferably at least 7.0 MPa, more preferably at least 7.7 MPa and most preferably at least 8.4 MPa.

The upper limit of the compressive strength for a density of from 550 kg/$m^3$ to 600 kg/$m^3$ can be up to 11.0 MPa, preferably up to 10.5 MPa.

For a density of from 605 kg/$m^3$ to 650 kg/$m^3$ the autoclaved aerated concrete preferably has a compressive strength of at least 7.5 MPa, preferably at least 8.3 MPa, more preferably at least 9.1 MPa and most preferably at least 10.0 MPa.

The upper limit of the compressive strength for a density of from 600 kg/$m^3$ to 650 kg/$m^3$ can be up to 13.0 MPa, preferably up to 12.5 MPa.

For a density of from 655 kg/m$^3$ to 700 kg/m$^3$ the autoclaved aerated concrete preferably has a compressive strength of at least 8.8 MPa, preferably at least 9.8 MPa, more preferably at least 10.8 MPa and most preferably at least 11.7 MPa.

The upper limit of the compressive strength for a density of from 650 kg/m$^3$ to 700 kg/m$^3$ can be up to 15.0 MPa, preferably up to 14.5 MPa.

For a density of from 705 kg/m$^3$ to 800 kg/m$^3$ the autoclaved aerated concrete preferably has a compressive strength of at least 12.1 MPa, preferably at least 13.5 MPa, more preferably at least 14.8 MPa and most preferably at least 16.2 MPa.

The upper limit of the compressive strength for a density of 750 kg/m$^3$ to 800 kg/m$^3$ can be up to 20.0 MPa, preferably up to 19.5 MPa.

The autoclaved aerated concrete according to the invention can be categorized in density classes and compressive strength classes according to DIN 20000-404:

For density class 0.35 kg/dm$^3$ the autoclaved aerated concrete preferably meets compressive strength class 2.

For density class 0.40 kg/dm$^3$ the autoclaved aerated concrete preferably meets compressive strength class 2.

For density class 0.45 kg/dm$^3$ the autoclaved aerated concrete preferably meets compressive strength class 2, more preferably compressive strength class 4.

For density class 0.50 kg/dm$^3$ the autoclaved aerated concrete preferably meets compressive strength class 4.

For density class 0.55 kg/dm$^3$ the autoclaved aerated concrete preferably meets compressive strength class 4.

For density class 0.60 kg/dm$^3$ the autoclaved aerated concrete preferably meets compressive strength class 4, more preferably compressive strength class 6.

For density class 0.65 kg/dm$^3$ the autoclaved aerated concrete preferably meets compressive strength class 6.

For density class 0.70 kg/dm$^3$ the autoclaved aerated concrete preferably meets compressive strength class 6, more preferably compressive strength class 8.

For density class 0.80 kg/dm$^3$ the autoclaved aerated concrete preferably meets compressive strength class 8.

The autoclaved aerated concrete according to the present invention preferably shows every combination of the properties as described above, most preferably shows all properties as described above.

The autoclaved aerated concrete according to is preferably produced by the process according to the invention as described above or below.

In a further aspect the present invention preferably relates to a process for producing the autoclaved aerated concrete as described above or below comprising the steps of:

a) Preparing a suspension comprising a silica source and a calcium oxide source in water, wherein the silica source comprises at least 50 wt % of soluble silica species;
b) Preparing a green highly porous solid from the suspension of step a);
c) Stream curing the green highly porous solid from step b) at a temperature of from 100° C. to 170° C. in the presence of saturated water steam; and
d) Recovering the autoclaved aerated concrete.

The suspension is preferably prepared by mixing the silica source and the calcium oxide source with water.

The silica source and the calcium oxide source are preferably introduced into the suspension in solid form, preferably in particulate form.

The silica source usually is in form of solid particles having a particle size d50 of from 1 μm to 500 μm, preferably from 5 μm to 100 μm more preferably from 10 μm to 50 μm.

The silica source usually has a particle size d10 of from 0.1 μm to 100 μm, preferably from 0.5 μm to 50 μm more preferably from 1.0 μm to 20 μm.

The silica source usually has a particle size d90 of from 5 μm to 750 μm, preferably from 15 μm to 500 μm more preferably from 25 μm to 250 μm.

The calcium oxide source usually is in form of solid particles having a particle size d50 of from 0.5 μm to 300 μm, preferably from 1 μm to 100 μm more preferably from 5 μm to 50 μm.

The calcium oxide source usually has a particle size d10 of from 0.1 μm to 100 μm, preferably from 0.5 μm to 50 μm more preferably from 0.8 μm to 20 μm.

The calcium oxide source usually has a particle size d90 of from 2 μm to 500 μm, preferably from 5 μm to 300 μm more preferably from 15 μm to 200 μm.

The weight ratio of water to solids in the suspension is preferably in the range of from 0.2 to 1.5, more preferably from 0.4 to 1.5 and most preferably from 0.5 to 0.9.

The silica source comprises at least 50 wt % of soluble silica species, being silica species having a solubility that is higher than that of quartz and having a solubility rate also higher than that of quartz.

Preferably, the silica source comprises from 50 to 100 wt %, more preferably from 60 to 100 wt % and most preferably from 70 to 100 wt % of soluble silica species.

In one embodiment the silica source consists of soluble silica species.

In another embodiment the silica source can comprise quartz in addition to the soluble silica species.

The weight ratio of the soluble silica species to quartz of 50:50 to 100:0, preferably from 60:40 to 100:0, most preferably from 70:30 to 100:0, based on the total weight of the silica source.

The soluble silica species are preferably selected from any silica species which has a higher solubility than quartz, such as cristobalite, tridymite, stishovite, fly ash and amorphous silica species, such as particles or porous aggregates of amorphous silica, siliceous earth, silica glass, alkali-silica glass and water glass, and mixtures thereof. Especially preferred are amorphous silica species, such as particles or porous aggregates of amorphous silica, siliceous earth, silica glass, alkali-silica glass, water glass and mixtures thereof.

The calcium oxide source is preferably selected from cement, burnt lime, hydrated lime and mixtures thereof.

The amounts of silica source and calcium oxide source in the suspension are preferably selected as such that the calcium/silicon molar ratio (C/S molar ratio) of the suspension is from 0.50 to 0.80, more preferably from 0.55 to 0.75 and most preferably from 0.60 to 0.70.

The solid material in the suspension preferably comprises from 20 to 50 wt %, more preferably from 25 to 45 wt % and most preferably from 27 to 42 wt % of soluble silica species, based on the total weight of the solid material in the suspension.

The solid material in the suspension preferably comprises from 0 to 20 wt %, more preferably from 0 to 15 wt % and most preferably from 0 to 12 wt % of quartz, based on the total weight of the solid material in the suspension.

The solid material in the suspension preferably comprises from 20 to 50 wt %, more preferably from 25 to 45 wt % and most preferably from 27 to 42 wt % of cement, based on the total weight of the solid material in the suspension.

The solid material in the suspension preferably comprises from 0 to 20 wt %, more preferably from 1 to 15 wt % and most preferably from 2 to 12 wt % of lime, such as burnt lime or hydrated lime or mixtures thereof, based on the total weight of the solid material in the suspension.

The solid material of the suspension can further comprise additional components other than the silica source and the calcium oxide source.

The solid material in the suspension preferably comprises from 0 to 15 wt %, more preferably from 1 to 12 wt % and most preferably from 2 to 10 wt % of anhydrite, based on the total weight of the solid material in the suspension.

The anhydrite usually acts as catalyst during steam curing.

The solid material in the suspension usually further comprises a sufficient amount of an aluminum source to achieve the desired density. This amount is below 0.2 wt % of the total solid material.

The aluminum source together with the calcium oxide source contribute to the chemical formation of gas bubbles during the production of the green highly porous solid and for adjusting the density of the resultant autoclaved aerated concrete.

The solid material in the suspension can further comprise up to 25 wt %, preferably up to 20 wt %, more preferably up to 15 wt % of recycled pulverized autoclaved aerated concrete, based on the total weight of the solid material in the suspension.

The recycled pulverized autoclaved aerated concrete, if present, is counted to the silica source in accordance with its molar amounts of silicon.

The solid material in the suspension can further comprise from up to 25 wt %, more preferably of up to 20 wt % and most preferably of up to 15 wt % of one or more fillers, such as calcium carbonate, based on the total weight of the solid material in the suspension.

The filler, if present, usually is inert during steam curing and does not release any ions.

In process step b) a green highly porous solid is formed from the suspension of process step a).

For forming the green highly porous solid the suspension is preferably poured into a mould, which preferably is oiled.

The suspension usually foams and swells within the mould due to a chemical reaction in which gas bubbles are formed from the aluminum source.

During 2 to 5 hours after foaming time the suspension usually hardens to an aerated concrete cake to such an extent that it can be cut into blocks of green highly porous solid.

The green highly porous solid of process step b) is then steam cured in process step c) at a temperature of from 100° C. to 170° C. in the presence of saturated water steam.

The temperature of the steam curing step is preferably from 110° C. to 165° C., more preferably from 115° C. to 160° C., still more preferably from 120° C. to 155° C., even more preferably from 125° C. to 150° C. and most preferably from 130° C. to 145° C.

During steam curing the pressure adjusts to the steam curing temperature in the saturated water steam atmosphere:

For a temperature of 100° C. the pressure is 1.0 bar(a).

For a temperature of 111° C. the pressure is 1.5 bar(a).

For a temperature of 170° C. the pressure is 8.0 bar(a).

The curing time usually in the range of from 2 to 15 hours, preferably from 3 to 12 hours.

The steam curing step c) is preferably conducted in an autoclave vessel.

Water steam is preferably supplied by a steam generator.

After the steam curing step the resultant autoclaved aerated concrete is recovered. Said autoclaved aerated concrete preferably shows all properties as described above or below.

In still another aspect the present invention relates to the use of a silica source comprising at least 50 wt % of soluble silica species for the production of an autoclaved aerated concrete.

Thereby, the silica source and the autoclaved aerated concrete preferably relates to the silica source and the autoclaved aerated concrete of all embodiments as described above and below.

Preferably, the autoclaved aerated concrete is an autoclaved aerated concrete produced according to the process according to the invention as described above and below.

It has surprisingly been found that when using a silica source comprising soluble silica species an autoclaved aerated concrete can be obtained with an unusually high compressive strength when using mild autoclaving conditions of a rather low temperature and also setting the calcium/silicon molar ratio to low values.

The reason for the high compressive strength is a rather high amount of tobermorite in the autoclaved aerated concrete.

Thereby, it has been found that when using a silica source comprising soluble silica species tobermorite formation depends on the curing conditions. At high steam curing temperature of around 180-191° C. , which is typically used when producing autoclaved aerated concrete from quartz or fly ash as silica source, only small amounts of tobermorite is formed which results in an autoclaved aerated concrete with a rather low compressive strength.

Thus, reduction of the curing temperature and pressure are a decisive measure for obtaining autoclaved aerated concrete with high compressive strength from silica sources which comprise soluble silica species.

Not to be bound by theory, it is believed that soluble silica species, such as amorphous silica species, require a lower energy than quartz to dissolve during steam curing so that at high temperatures the soluble silica species dissolve faster than quartz, which results in a high silicon supply to the matrix and prevents tobermorite formation due to a too low C/S molar ratio of the initially formed CSH phases.

Thereby, the C/S molar ratio in the CSH phases depends on two factors: Firstly, on the curing temperature as lower curing temperatures lead to higher C/S ratios in the initially formed CSH phases, as discussed above; secondly, on the C/S molar ratio in the starting material, i.e. the suspension.

It is therefore also suggested to adapt the molar ratio in the raw material mixture to be used as solid material in the suspension of process step a) to the above discussed relations.

Thereby, it has been found that good results are obtained when using a low C/S molar ratio of not more than 0.80 in the raw material mixture to be used as solid material in the suspension of process step a) for curing temperatures of 170° C. or lower.

The high compressive strength of the resultant autoclaved aerated concrete thereby allows production of autoclaved aerated concrete products with lower densities and still high compressive strength, which broadens the density spectrum of the resultant autoclaved aerated concrete products.

The benefits of the present invention are that

- New autoclaved aerated concrete products are available with lower density, which allows the production of autoclaved aerated concrete products with improved thermal insulation properties;

- New autoclaved aerated concrete products are available with increased compressive strength in each of the density grades for masonry and panels;
- Common autoclaved aerated concrete products can be produced with less binders (cement and lime) in the recipe;
- A broader range of silica materials, especially amorphous silica species can be used in the production of autoclaved aerated concrete, thereby replacing quartz;
- Saving resources of quartz sand is achieved;
- Reuse of industrial waste with high content of amorphous silica is possible;
- Reduced energy consumption due to reduced temperature and pressure during steam curing is achieved;
- Reduced $CO_2$ emissions due to reduced energy consumption and reduced amounts of binder are established.

EXAMPLES

1. Determination Methods a) Compressive Strength

Compressive strength was determined according to DIN EN 772-1. After cutting into 10×10×10 cm3 cubes and drying at 50° C. for several days until a moisture content of 6±2 mass % was reached.

b) XRD Analysis

For the determination of the amounts of tobermorite, amorphous CSH phases, residual quartz and residual phases of soluble silica species XRD analyses were performed using the Bruker D2 Phaser diffractometer with Cu-Kα radiation and a Silicon Strip Detektor (LynxEye). All samples were measured with a step size of 0. 02° and 4 s/step over the range of 5-65° 2θ. Qualitative XRD analysis was performed using DIFFRAC.EVA software base on the database of the International Center for Diffraction Data (ICDD). XRD quantitative analysis was carried out using DIFFRACplus TOPAS V 4.2 software based on the Rietveld method and 10% of ZnO as the internal standard. Structure files were identified based on the Inorganic Crystal Structure Database (ICSD).Wet milling method using the XRD-Mill McCrone was performed for the preparation of samples. Each sample was measured three times including sample preparation and XRD measurement and an average of values was reported.

c) Density

Dry bulk density was determined according to DIN EN 772-13 after drying the cubes at a temperature of 105±5° C. in an oven to obtain a constant weight.

d) Differential thermal analysis (DTA)

Thermal analysis including DTA-TG measurement were performed using NETZSCH STA 409 CD over the temperature range of 23-1200° C. at a heating rate of 10° C./min.

2. Preparation of Suspensions

For the production of autoclaved aerated concrete (AAC) blocks of examples Inv Ex 1 and CE 2, CE 3 and CE 4 two suspensions comprising solids compositions Comp 1 and Comp 2 as described in Table 1 below were mixed.

The reference recipe of Comp 2 was adjusted to P4-500 grade, similar to the mix proportion of AAC produced in the industry. It was composed of 50-30% quartz, 40-20% cement, 5-15% lime, 5-10% Anhydrite, 10-20% return pulverized AAC and 0.05-0.09 aluminum paste. In inventive suspension of Comp 1 50-80 wt % of the quartz was replaced by diatomaceous earth (DE) as soluble silica species.

The aluminium values was set in a way to obtain a density of 500 kg/m$^3$. The weight ratio of water to solids was adjusted to obtain a suitable fluidity of the suspension.

The C/S molar ratio was adjusted to a range of from 0.63 to 0.64. For better comparison all silica sources were selected to have a similar particle size distribution.

The quartz sand had a particle distribution of d10 of 3.69 μm, d50 of 20.4 μm and d90 of 65.6 μm. The diatomaceous earth had a particle distribution of d10 of 8.01 μm, d50 of 21.9 μm and d90 of 59.1 μm. The cement had a particle distribution of d10 of 2 μm, d50 of 10 μm and d90 of 27 μm.

TABLE 1

Solids composition in the suspension of examples Comp 1 and Comp 2

| | Comp 1 | Comp 2 |
|---|---|---|
| Quartz [wt %] | 10 | 41 |
| Diatomaceous earth (DE) [wt %] | 33 | 0 |
| Cement [wt %] | 31 | 31 |
| Lime [wt %] | 10 | 10 |
| Anhydrite [wt %] | 6 | 6 |
| Recycled pulverized AAC [wt %] | 10 | 12 |

3. Production of the Autoclaved Aerated Concrete Blocks

The soluble silica species and quartz were mixed with water. Lime, cement and anhydrite were then added, and the mixture was stirred for 2 minutes. Then an aluminum suspension was added and the mixing was repeated for half a minute. The slurries were poured into molds. The samples were stored at room temperature for 3 hours. After demolding, samples were cured in the autoclave at various temperatures between T=130-195° C. and corresponding steam pressure of p=2.8-14 bar(a) for certain range of 3-12 hours. The used autoclave is a small one (1.5 m$^3$) which is still comparable to industrial autoclaves with external steam supply. After removing the samples from the autoclave, the samples were cut into 10×10×10 cm cubes and were dried at 50° C. for several days until a moisture content of 6±2 mass % was reached.

4. Testing and Characterizing

Different measurements including compressive strength according to DIN EN 772-1, X-Ray Diffraction (XRD) analyses, Scanning Electron Microscope (SEM) and thermal analyses were performed. In the next step, the dry bulk density was determined according to DIN EN 772-13. For this purpose, the cubes were dried at a temperature of 105±5° C. in the oven to constant weight. Qualitative XRD analysis was performed base on the database of the International Center for Diffraction Data (ICDD). XRD quantitative analysis was carried out using the Rietveld method and 10% of ZnO as the internal standard.

In Table 2 the autoclaving conditions and chemical and mechanical properties of AAC samples Inv Ex 1 and CE 2, CE 3 and CE 4 are shown.

Thereby, AAC sample Inv Ex 1 represents an AAC sample according to the invention produced from Comp 1 using the process according to the invention. AAC sample CE 2 represents a reference AAC produced from Comp 1 using the process using higher curing temperature and pressure. AAC sample CE 3 represents an AAC sample according to the invention produced from Comp 2 using the process using higher curing temperature and pressure. AAC sample CE 4 represents a reference AAC produced from Comp 2 using the process according to the invention.

TABLE 2

Chemical and mechanical properties of AAC samples Inv Ex 1 and CE 2, CE 3 and CE 4

| Properties | Inv Ex 1 | CE 2 | CE 3 | CE 4 |
|---|---|---|---|---|
| Solids composition | Comp 1 | Comp 1 | Comp 2 | Comp 2 |
| curing conditions | 134° C. 3 bar(a) | 192° C. 13 bar(a) | 192° C. 13 bar(a) | 134° C. 3 bar(a) |
| compr. strength [MPa] | 5.7 | 4.4 | 4.2 | 0.6 |
| density [kg/m$^3$] | 496 | 486 | 491 | 492 |
| tobermorite [wt %] | 15 | 12 | 41 | 8 |
| amorphous CSH [wt %] | 57 | 64 | 28 | 35 |
| residual quartz [wt %] | 10 | 7 | 15 | 33 |
| residual soluble silica species [wt %] | 1 | 0.6 | — | — |

The invention claimed is:

1. A process for producing an autoclaved aerated concrete comprising the steps of:

a) preparing a suspension comprising a silica source and a calcium oxide source in water, wherein the silica source comprises at least 50 wt % of soluble silica species;

b) preparing a green porous solid from the suspension of step a);

c) steam curing the green porous solid from step b) at a temperature of from 100° C. to 170° C. in the presence of saturated water steam; and d) recovering the autoclaved aerated concrete, wherein the autoclaved aerated concrete has a content of tobermorite of at least 12.5 wt % and a content of amorphous calcium silicate hydrate (CSH) phases of at least 30 wt %, based on the total weight amount of autoclaved aerated concrete.

2. The process according to claim 1, wherein the silica source comprises the soluble silica species and quartz in a weight ratio of the soluble silica species to quartz of 50:50 to 100:0, based on the total weight of the silica source.

3. The process according to claim 1, wherein the soluble silica species is selected from cristobalite, tridymite, stishovite, fly ash, amorphous silica species, siliceous earth, silica glass, alkali-silica glass and water glass, and mixtures thereof.

4. The process according to claim 3, wherein the amorphous silica species are particles or porous aggregates of amorphous silica.

5. The process according to claim 1, wherein the calcium oxide source is selected from cement, burnt lime, hydrated lime, and mixtures thereof.

6. The process according to claim 1, wherein the calcium/silicon molar ratio (C/S molar ratio) of the raw materials mixture of step a) is from 0.50 to 0.80.

7. The process according to claim 1, wherein the suspension further comprises up to 25 wt % of recycled pulverized autoclaved aerated concrete, based on the total amount of solid material in the suspension, which is counted to the silica source in accordance with its molar amounts of silicon.

8. The process according to claim 1, wherein the autoclaved aerated concrete has a content of residual quartz of not more than 20 wt %, based on the total weight amount of autoclaved aerated concrete.

9. The process according to claim 1, wherein the autoclaved aerated concrete has a density of from 200 to 800 kg/m$^3$.

10. The process according to claim 1, wherein the autoclaved aerated concrete has one of the following properties:

a compressive strength of at least 1.5 MPa for a density of from 205 to 250 kg/m$^3$, a compressive strength of at least 2.0 MPa for a density of from 255 to 300 kg/m$^3$, a compressive strength of at least 2.5 MPa for a density of from 305 to 350 kg/m$^3$, a compressive strength of at least 3.0 MPa for a density of from 355 to 400 kg/m$^3$, a compressive strength of at least 3.7 MPa for a density of from 405 to 450 kg/m$^3$, a compressive strength of at least 4.5 MPa for a density of from 455 to 500 kg/m$^3$, a compressive strength of at least 5.3 MPa for a density of from 505 to 550 kg/m$^3$, a compressive strength of at least 6.3 MPa for a density of from 555 to 600 kg/m$^3$, a compressive strength of at least 7.5 MPa for a density of from 605 to 650 kg/m$^3$, a compressive strength of at least 8.8 MPa for a density of from 655 to 700 kg/m$^3$, or a compressive strength of at least 12.1 MPa for a density of from 705 to 800 kg/m$^3$.

11. The process according to claim 1, wherein the autoclaved aerated concrete has one of the following properties:

for density class 0.35 kg/dm$^3$ the autoclaved aerated concrete meets compressive strength class 2;

for density class 0.40 kg/dm$^3$ the autoclaved aerated concrete meets compressive strength class 2;

for density class 0.45 kg/dm$^3$ the autoclaved aerated concrete meets compressive strength class 2;

for density class 0.50 kg/dm$^3$ the autoclaved aerated concrete meets compressive strength class 4;

for density class 0.55 kg/dm$^3$ the autoclaved aerated concrete meets compressive strength class 4;

for density class 0.60 kg/dm$^3$ the autoclaved aerated concrete meets compressive strength class 4;

for density class 0.65 kg/dm$^3$ the autoclaved aerated concrete meets compressive strength class 6;

for density class 0.70 kg/dm$^3$ the autoclaved aerated concrete meets compressive strength class 8; or for density class 0.80 kg/dm$^3$ the autoclaved aerated concrete meets compressive strength class 8, wherein the density classes and compressive strength classes are categorized according to DIN 20000-404.

12. The process according to claim 1, wherein the autoclaved aerated concrete shows a peak of wollastonite ($CaSiO_3$) formation at a temperature of 835-843° C. in differential thermal analysis (DTA) in accordance with DIN 51004.

* * * * *